(12) United States Patent
Venkatakrishnan et al.

(10) Patent No.: US 11,871,866 B2
(45) Date of Patent: Jan. 16, 2024

(54) MODULAR BREW SYSTEMS

(71) Applicant: Starbucks Corporation, Seattle, WA (US)

(72) Inventors: Natarajan Venkatakrishnan, Bellevue, WA (US); Joseph Emil Gormley, Mercer Island, WA (US)

(73) Assignee: Starbucks Corporation, Seattle, WA (US)

( * ) Notice: Subject to any disclaimer, the term of this patent is extended or adjusted under 35 U.S.C. 154(b) by 537 days.

(21) Appl. No.: 16/890,202

(22) Filed: Jun. 2, 2020

(65) Prior Publication Data

US 2021/0369038 A1 Dec. 2, 2021

(51) Int. Cl.
| | |
|---|---|
| *A47J 31/00* | (2006.01) |
| *A47J 31/52* | (2006.01) |
| *A47J 31/54* | (2006.01) |
| *A47J 31/56* | (2006.01) |
| *A47J 31/46* | (2006.01) |
| *A47J 31/42* | (2006.01) |
| *A47J 31/44* | (2006.01) |

(52) U.S. Cl.
CPC .......... *A47J 31/007* (2013.01); *A47J 31/525* (2018.08); *A47J 31/545* (2013.01); *A47J 31/56* (2013.01); *A47J 31/42* (2013.01); *A47J 31/4403* (2013.01); *A47J 31/469* (2018.08)

(58) Field of Classification Search
CPC ........ A47J 31/007; A47J 31/42; A47J 31/525; A47J 31/545; A47J 31/56; A47J 31/469; A47J 31/4403
See application file for complete search history.

(56) References Cited

U.S. PATENT DOCUMENTS

| | | | |
|---|---|---|---|
| 5,901,634 A | | 5/1999 | Vancamp et al. |
| 5,953,981 A | * | 9/1999 | Lassota ................. A47J 31/446 |
| | | | 99/290 |
| 6,564,697 B2 | | 5/2003 | Maxwell et al. |

(Continued)

FOREIGN PATENT DOCUMENTS

| | | |
|---|---|---|
| CN | 116157046 A | 5/2023 |
| DE | 84 11 684 U1 | 9/1984 |

(Continued)

OTHER PUBLICATIONS

International Search Report and Written Opinion; PCT/US2021/033185; dated Aug. 5, 2021.

(Continued)

*Primary Examiner* — Nathaniel E Wiehe
*Assistant Examiner* — Dilnessa B Belay
(74) *Attorney, Agent, or Firm* — Knobbe, Martens, Olson & Bear, LLP (57) ABSTRACT

A modular brewing system is described for providing hot water and managing power to multiple brew tower modules using a single centralized boiler and power management module so as to limit the number of high-power circuits required in a coffeehouse or store. The boiler and power management module manages power of components of the centralized boiler assembly and any brew tower modules connected thereto, including the boiler heaters, the grinder motors, and the brew chamber heaters.

6 Claims, 5 Drawing Sheets

(56) References Cited

U.S. PATENT DOCUMENTS

| | | | |
|---|---|---|---|
| 7,202,449 B1* | 4/2007 | Renau | A47J 31/54 219/486 |
| 7,673,555 B2 | 3/2010 | Nosler et al. | |
| 8,087,346 B2 | 1/2012 | Webster et al. | |
| 8,468,933 B2 | 6/2013 | Koschberg et al. | |
| 8,616,116 B2 | 12/2013 | McLaughlin | |
| 8,621,982 B2 | 1/2014 | Nosler et al. | |
| 8,621,983 B2 | 1/2014 | Hart et al. | |
| 8,910,563 B2 | 12/2014 | Hulett et al. | |
| 8,944,354 B2 | 2/2015 | Hulett et al. | |
| 8,973,485 B2 | 3/2015 | Krauchi et al. | |
| 9,218,633 B2 | 12/2015 | Hulett et al. | |
| 9,232,873 B2 | 1/2016 | Juris et al. | |
| 9,282,849 B2 | 3/2016 | Windler et al. | |
| 9,439,532 B2 | 9/2016 | Crarer et al. | |
| 9,820,603 B2 | 11/2017 | Singer et al. | |
| 9,930,987 B2 | 4/2018 | Hulett et al. | |
| 9,962,030 B2 | 5/2018 | Avins et al. | |
| 10,314,426 B2 | 6/2019 | Hulett et al. | |
| D990,957 S | 7/2023 | Wykes et al. | |
| 2010/0173054 A1 | 7/2010 | Camera | |
| 2013/0019756 A1* | 1/2013 | Coats | A47J 31/04 99/281 |
| 2013/0133520 A1* | 5/2013 | Hulett | A47J 31/40 99/290 |
| 2013/0220137 A1 | 8/2013 | Bombeck et al. | |
| 2016/0264348 A1 | 9/2016 | Camera et al. | |
| 2016/0278572 A1 | 9/2016 | Beschi | |
| 2016/0367068 A1 | 12/2016 | Cable et al. | |
| 2016/0367069 A1 | 12/2016 | Cable et al. | |
| 2022/0257044 A1 | 8/2022 | Venkatakrishnan et al. | |
| 2023/0133724 A1 | 5/2023 | Venkatakrishnan et al. | |

FOREIGN PATENT DOCUMENTS

| | | |
|---|---|---|
| JP | D1522567 | 4/2015 |
| JP | D 1640464 | 9/2019 |
| JP | D 1664301 | 7/2020 |
| KR | 20230019867 A | 2/2023 |
| TW | D114460 | 12/2006 |
| TW | D170705 | 9/2015 |
| WO | WO 2016/193223 A1 | 12/2016 |
| WO | WO 2017/134141 A1 | 8/2017 |
| WO | WO 2019/057619 A1 | 3/2019 |
| WO | WO 2019/077570 A1 | 4/2019 |
| WO | WO 2021/146406 A2 | 7/2021 |
| WO | WO 2021/247242 A1 | 12/2021 |

OTHER PUBLICATIONS

Bloomfield Dual Coffee Brewer, Owners Manual; 23 pages (downloaded from https://www.bloomfieldworldwide.com/products/airpot-8792af/ on Feb. 3, 2020).

Bunn ICB Twin Spec Sheet; Jan. 13, 2020; 4 pages (downloaded from https://commercial.bunn.com/54200.0101#docs on Feb. 3, 2020).

Bunn VLPF Parts Catalog; 1994 Bun-O-Matic Corporation; 18 pages (downloaded from https://commercial.bunn.com/07400.0005#docs on Feb. 3, 2020).

Curtis G3 D1000 Series User Guide; 31 pages (downloaded from https://cdn.wilburcurtis.com/sites/default/files/manuals/F-10028.pdf on Feb. 3, 2020).

Curtis G4 Seraphim User Guide; 36 pages (downloaded from https://cdn.wilburcurtis.com/sites/default/files/manuals/F-10017.pdf on Feb. 3, 2020).

Fetco CBS-1130 User Guide & Operator Instructions; Mar. 2018; 26 pages (downloaded from https://www.fetco.com/images/Files/p166-cbs-1130-v.pdf on Feb. 3, 2020).

Bendall, Food Management, How to Buy Coffee Equipment, vol. 46, Iss. 9, Sep. 2011, 3 pages.

Marco SP9 Instruction Manual; 16 pages (downloaded from https://marcobeveragesystems.com/wp-content/uploads/2017/10/1900092-Instruction-Booklet-SP9-Rev8.pdf on Feb. 3, 2020).

Modbar Espresso AV Brochure; 2 pages (downloaded from https://modbar.com/system/espresso-av/ on Feb. 3, 2020).

Modbar AV 2 Group Pre-Installation Specifications; Jun. 8, 2019; 3 pages (downloaded from https://modbar.com/system/espresso-av/ on Feb. 3, 2020).

Nespresso Momento 200 User Manual; 36 pages (downloaded from https://www.nespresso.com/shared_res/manuals/momento/Momento_200_EN_A5_US.pdf on Feb. 3, 2020).

International Preliminary Report on Patentability, PCT/US2021/033185; dated Dec. 6, 2022, 6 pages.

* cited by examiner

MODULAR BREW SYSTEMS

BACKGROUND

Coffeehouses typically include a commercial brewing machine capable of preparing coffee beverages for customers. These coffeehouses can experience different levels of consumer demand at certain times of the day or as the popularity of the coffeehouse grows. Adapting to the fluctuating demands is often complex and difficult to address.

DETAILED DESCRIPTION

Generally described, this disclosure is directed to a modular beverage preparation system (e.g., modular coffee brewing system) for use in a commercial or public facility or venue that prepares beverage products (e.g., coffee or tea) for customers, such as a coffeehouse, coffee shop, juice store, smoothie store, retail store, restaurant, parlor, bar, food stall, and/or the like. Consumer demand at these beverage preparation locations (e.g., coffeehouses or stores) can fluctuate greatly as the location becomes more popular over time or at different times of the day. A beverage preparation system can include several components that each may require a relatively large amount of power to operate. At least in certain countries, the large amount of power required may necessitate installation of upgraded high-power (e.g., 220 V, 50 A) circuits/outlets wired to an electrical control panel because the amount of power required to operate the beverage preparation system is more than a standard 110 V outlet (which is standard in the United States, for example) can provide. If multiple conventional beverage preparation systems are required in a single location (e.g., a single coffeehouse or store) due to consumer demand, the requisite power to operate and control the components of each separate conventional system may require each separate conventional system to be powered by a separate high-power circuit/outlet because a single high-power (e.g., 220V, 50 A) circuit/outlet may not be capable of providing sufficient power to simultaneously power the multiple conventional systems during times of high consumer demand. In locations with high throughput, or high consumer demand, it can be imperative that multiple brew systems be operated simultaneously to prevent customers from having to wait too long for their beverages to be prepared, which could drive away customers.

Because of the large amount of power typically required by the conventional beverage preparation systems, it can be difficult to adapt to increases in consumer demand at an established retail location, which typically has an existing power infrastructure that is not able to be quickly or cheaply upgraded or modified to add additional power resources (e.g., additional high-power circuits/outlets). Adding additional power infrastructure can require substantial remodeling and renovation, which can require significant expense and a disruption to existing business during the remodeling and renovation. In addition to additional power infrastructure requirements, adding additional independent and stand-alone beverage preparation machines could take up valuable space in an already-crowded preparation area.

In accordance with embodiments described herein, a modular coffee brewing system includes a boiler assembly (which typically requires a significant portion of the total power consumption of a coffee brewing system), as well as the power management and control functionality of the modular coffee brewing system, in a single base module, or unit. This base module, or centralized unit, can then be operatively connected to multiple brew tower modules, or units, that each include the rest of the structural components and functionality of a coffee brewing system (e.g., hopper assembly, grinder assembly, brew assembly, etc.). The base module (e.g., via the boiler assembly) is configured to supply hot water to, and operational control (including power management) of, multiple coffee brew tower modules. Because of the centralized boiler and power management structures and functions in the base module, the modular brew systems described herein may only require use of a single high-power (e.g., 220 V, 50 A) circuit/outlet to power multiple brew tower modules operating simultaneously, which allows for increased output without requiring installation of additional high-power circuits/outlets. Accordingly, significant expense and disruption to existing retail business can be avoided and the modular system may easily adapt to fluctuations in consumer demand and physical store limitations or constraints.

In accordance with several embodiments of the disclosure, a modular beverage preparation system (e.g., modular coffee brewing system) may provide one or more of the following advantages or benefits: (i) flexibility and adaptability to meet fluctuating consumer demands, (ii) reduced space requirements as additional beverage preparation equipment is added to meet increasing demands, (iii) reduced overall costs, complexity and time required to adapt to the fluctuating consumer demands, (iv) ease and reduced inconvenience when replacing or fixing defective components of the beverage preparation equipment; and/or (v) reduction in need to install additional high-power circuits, especially at an already-established facility in which installation of additional high-power circuits would require substantial remodeling and reconstruction, thereby greatly increasing expense and disruption to existing business.

Figure 1:
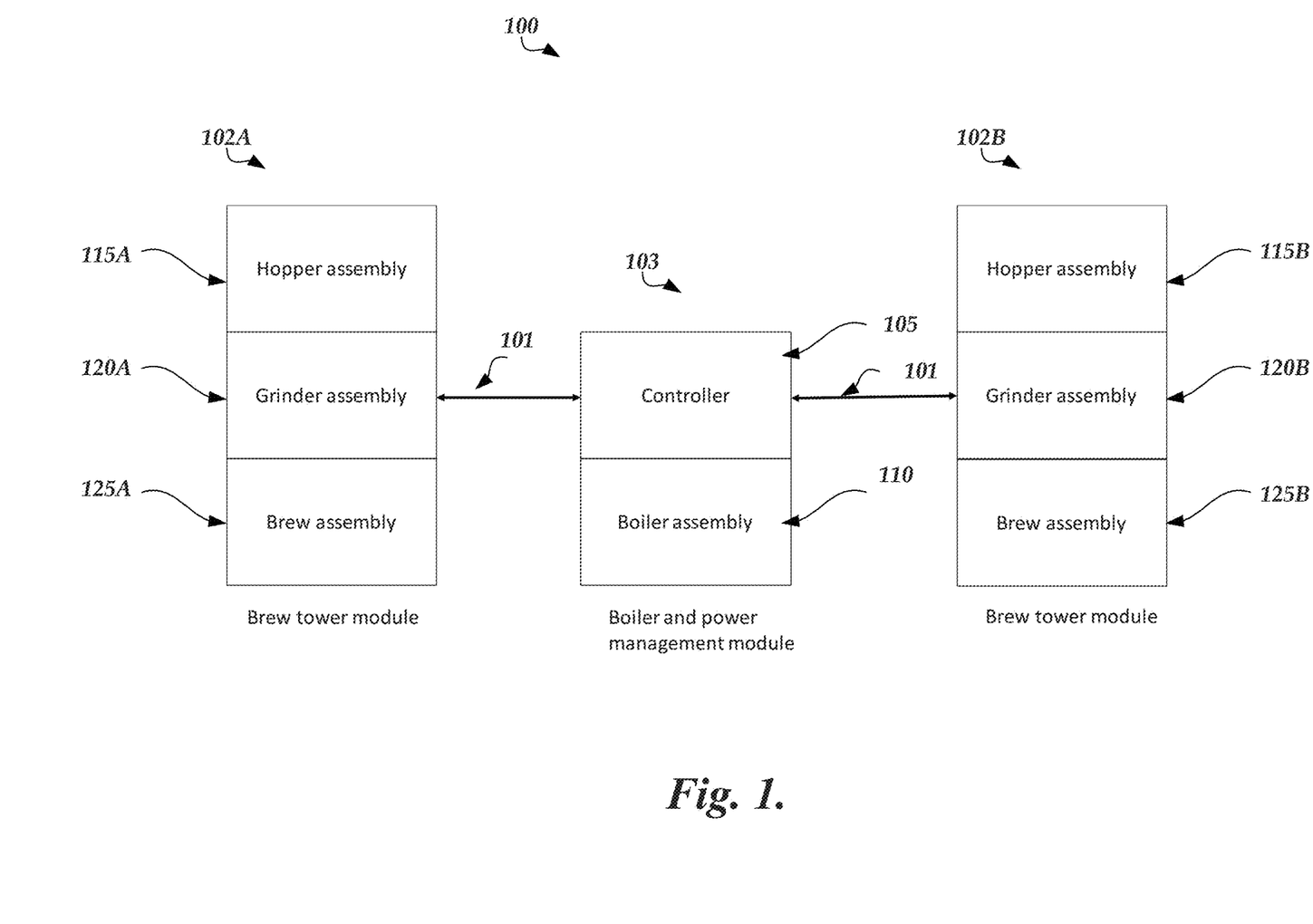
FIG. 1 is a schematic block diagram illustrative of an embodiment of a modular brew system including a single boiler and power management module operatively coupled to two brew tower modules.

FIG. 1 illustrates a schematic block diagram of an embodiment of a modular brew system 100. The modular brew system 100 includes a centralized base module comprising a boiler and power management module 103 configured to generate hot water, and control operation and manage power of, the modular brew system 100, including any (e.g., one, two, three, four, or more) brew tower modules 102A,102B operatively coupled to the boiler and power management module 103. Operative coupling between the boiler and power management module 103 and the brew tower modules 102 may include fluid coupling through fluid conduits (e.g., water hoses) and wired communicative coupling through input/output ports and/or communication cables capable of transmitting and receiving data and/or power. In some configurations, wireless communicative coupling over a wireless communications network (e.g., using personal area networks, local area networks, inductive links, etc.) may be used instead of, or in addition to, wired communicative coupling. The wireless communications may involve exchanging of data and/or power via short-wavelength (e.g., ultra-high frequency (UHF) or super high frequency (SHF)) radio waves, or inductive coils.

The base module, e.g., boiler and power management module 103, includes a controller 105 (which includes and provides centralized control and power management electronics and functionality) and a centralized boiler assembly 110 (which may require a significant percentage of the overall power consumption due to the multiple heating elements used to heat the water) for the combined modular brew system 100. The centralized structural and functional features of the boiler and power management module 103 advantageously allows for multiple brew tower modules 102 to simultaneously be run on a single high power circuit/outlet (e.g., circuit providing at least 200 V and 50 A of power) during times of high demand and for a single brew tower module to be run in times of low demand. In accordance with several implementations, the brew tower modules are not powered separately by an electrical outlet.

The control and power management electronics of the controller 105 may include circuit breakers, DC power supplies, printed circuit board assemblies or other circuitry, relays or other electronic switching devices, microcontrollers, application-specific integrated circuits, and/or software code modules (such as power management algorithms stored in memory) executed by one or more microcontrollers or processors or circuitry. The code modules may be stored in any type of computer-readable medium or other computer storage device, such as read-only memory, flash memory, random-access memory, and/or the like.

The boiler assembly 110 may include one or more boilers configured to generate and supply heated water for preparing hot beverages (e.g., coffee beverages). There may be one, two, three, or more than three boilers in the boiler assembly 110. Each boiler may include one or more heating elements configured to heat water within fluid supply lines or reservoirs to a desired brewing temperature (e.g., 190 to 200 degrees Fahrenheit) and maintain the desired brewing temperature. The heating elements can include one or more devices that use electrical energy to generate and/or remove heat. For example, the devices can include, but are not limited to, resistance wire, etched foil, coils, induction heater, radiator, heat exchanger, magnetron, thermoelectric device, Peltier cooler, compressor, etc. The boiler and power management module 103 may include multiple fluid conduits (e.g., water hoses) configured to be operatively coupled to a respective fluid inlet port of a brew tower module 102. The fluid conduits may receive water from a central water supply or reservoir system of the facility or venue in which the brewing system 100 resides. The materials used for the fluid conduits (e.g., water hoses) may be metal, polymer, or carbon-based. The end connectors of the fluid conduits may be rapid-connect-type connectors or threaded connectors. The fluid conduits (e.g., end connectors) and/or fluid reservoir(s) in the boiler and power management module 103 may include air release vents adapted to enable priming of the water connection. The fluid conduits (e.g., end connectors), fluid reservoir(s) in the boiler and power management module 103, and/or central system water supply outlets may include shutoff valves adapted to quickly shut off water supply to prevent water drips or leakages during connection and disconnection.

Each brew tower module 102 includes (e.g., consists essentially of) a hopper assembly 115A,115B, a grinder assembly 120A,120B, and a brew assembly 125A,125B. Each hopper assembly 115 may include multiple hoppers for storing different types of coffee beans to produce different types of coffee beverages. In some implementations, the hopper assembly 115 may consist of a single hopper. The one or more hoppers may be refillable. The one or more hoppers may supply an appropriate amount of coffee beans to the grinder assembly 120. Each grinder assembly 120 may be configured to grind the coffee beans into grounds of an appropriate, or a particular, particle size. The grounds may then be delivered to the brew assembly 125, where they are combined with hot water supplied by the boiler assembly 110 of the boiler and power management module 103. The brew assembly 125 may be configured to brew the coffee beverage according to a defined recipe or formula for the desired beverage (e.g., certain brew time duration, temperature, pressure, ingredients, flavors, etc.). For example, the brew assembly 125 may be configured to extract the coffee from the grounds and hot water using a vacuum applied to a brew chamber, as is performed by the CLOVER® brewing machines used commercially by the Applicant. The brew chamber may include one or more heating elements to heat and/or maintain a temperature of the beverage during brewing and/or prior to dispensing.

The brew assembly 125 may incorporate one or more filters that may require periodic replacement (e.g., after each single-serve beverage portion is prepared or after multiple single-serve beverage portions are prepared). The brewed coffee beverage is then dispensed into a cup or other beverage holder by a dispensing assembly (e.g., spout or tap). The hopper assembly 115, grinder assembly 120, and brew assembly 125 may incorporate any of the operational and/or structural features of the corresponding assemblies described in Applicant's U.S. Pat. No. 9,930,987, which is incorporated by reference herein.

In accordance with the illustrated embodiments, the brew tower modules 102 advantageously do not include a boiler assembly 110 or a controller 105. The illustrated embodiments of the brew tower modules 102 also are not configured to be directly connected to a high-power circuit in a stand-alone manner and are not configured to be directly connected to a building water supply. In some configurations, the brew tower modules 102 receive their power and water only from the base boiler and power management module 103 (e.g., are not powered by a separate electrical circuit/outlet) and cannot operate independently of the base boiler and power management module 103. In some configurations, the brew tower modules 102 may each include one, some, or all of the structural and/or functional features of the controller 105 instead of, or in addition to, the boiler and power management module 103.

The boiler and power management module 103 is configured to operatively connect to each brew tower module 102 through one or more fluid conduits (e.g., water hoses), communication cables (e.g., data cables), and/or power cables 101. In some embodiments, the boiler and power management module 103 is configured to operatively connect to each brew tower module 102 through a single water hose, a single power cable, and a single data cable. The power cable and data cable may be combined into a single integrated communications cable providing both power and data transfer capability. Multiples of the various hoses or cables may be used as desired and/or required.

The boiler and power management module 103 may control initiation of the brewing process in each connected brew tower module 102. The boiler and power management module 103 and/or the brew tower modules 102 may include user inputs (e.g., buttons, switches) configured to receive input from a user that may be used to prepare a desired beverage (e.g., input regarding size of the beverage, type of beverage, etc.). The boiler and power management module 103 may include one or more sensors configured to sense the number of brew tower modules connected to it. The boiler and power management module 103 may be configured to manage the overall modular system power based on the number of brew tower modules connected so that the overall modular system 100 can operate on a single high power circuit (e.g., voltage level of at least 200 V and current of at least 50 A).

The boiler and power management module 103 and the brew tower modules 102 are relatively light in mass due to the presence of fewer components in each module compared to a conventional brew tower system that includes all of the components of the boiler and power management module and a brew tower module in a single combined system. Thus, the modules of the modular brew system 100 are easier for technicians to install in coffee houses or store locations. For example, the mass of the boiler and power management module 103 may be around 80 pounds compared to a mass of around 200 pounds for a conventional combined brew system (e.g., about 40% of the mass). Because the system 100 is modular, it is relatively easy to break the system 100 apart into separate modules for accessibility for maintenance and moving. In addition, because the system 100 is modular, it allows for convenient removal of one of the brew tower modules 102 for maintenance while still keeping a brewing system in place to service the customers. The modularity allows a service technician to swap out a brew tower module 102 with another prepared brew tower module 102 to limit down time and otherwise avoid inconvenience and disruption to existing business.

Figure 2A:
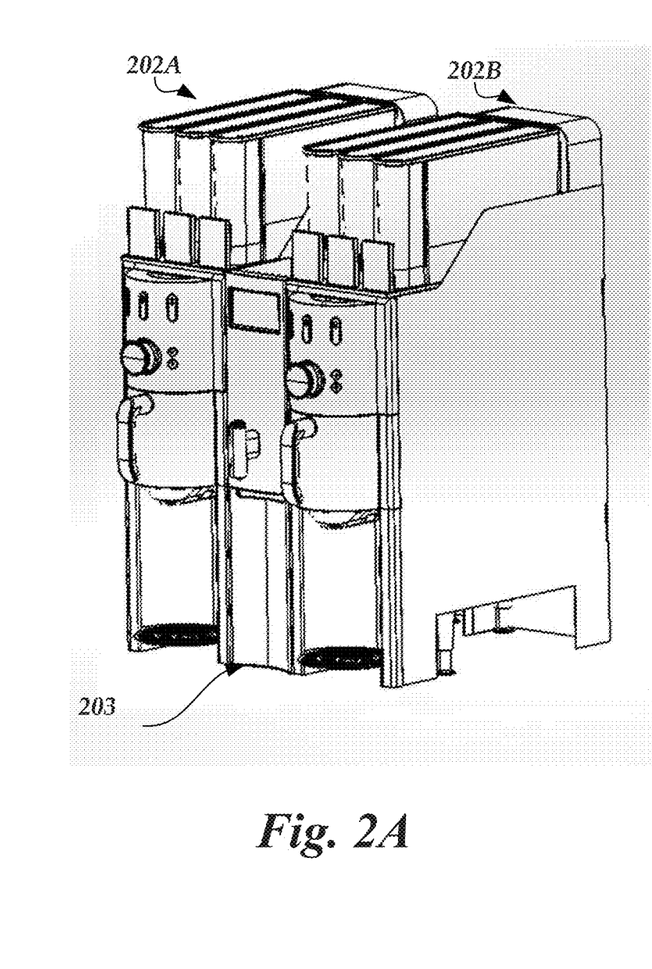
FIG. 2A is a perspective view of an embodiment of a modular brew system including a single boiler and power management module operatively coupled to two brew tower modules.
Figure 2B:
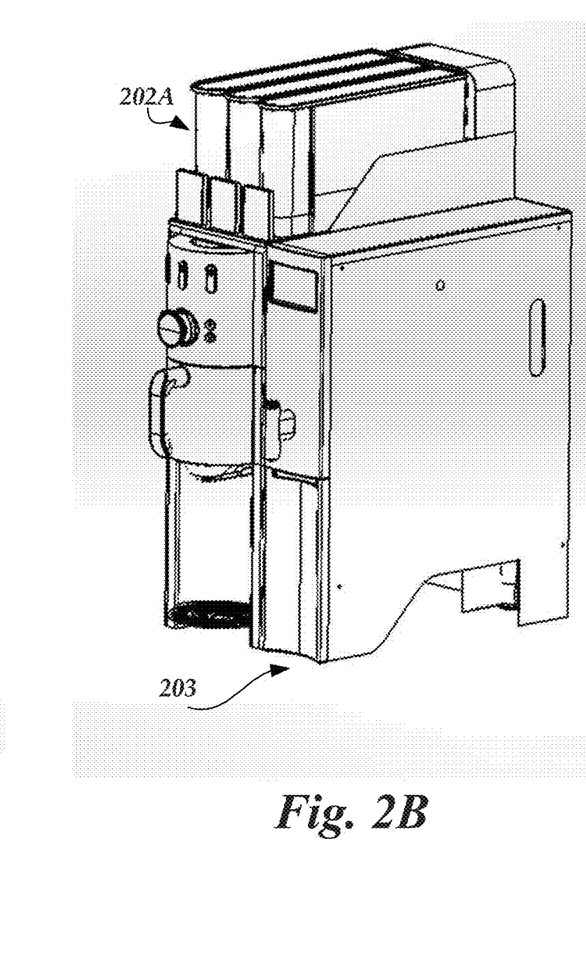
FIG. 2B is a perspective view of an embodiment of a modular brew system including a single boiler and power management module operatively coupled to a single brew tower module.

FIG. 2A illustrates a perspective view of an embodiment of a modular brew system 200 in which two brew tower modules 202A, 202B are operatively coupled to the base boiler and power management module 203. The modular brew system 200 and its component modules 202,203 may include the structural and functional features described above in connection with the schematic block diagram of FIG. 1, and vice-versa. FIG. 2B illustrates an embodiment of the modular system 200 at a time when a single brew tower module 202A is operatively coupled to the boiler and power management module 203.

The modular brew system 200 is advantageously designed for long-term flexibility. In accordance with several implementations, the modular system 200 is designed around the boiler assembly 210 so it is possible to just have a boiler assembly 210 that provides hot water (e.g., via a hot water tap of the boiler assembly 210) without any brew tower modules 202 connected to the boiler and power management module 203. In some implementations, the water pressure is between 20 psi and 40 psi (between about 1.4 bar and 2.8 bar). The boiler assembly 210 may optionally include a pressure regulator.

The boiler assembly 210 may be configured to provide water simultaneously to the hot water tap of the boiler assembly 210 and to any connected brew tower modules 202 (or at least two brew tower modules at a time). The water may be provided to each brew tower module (and optionally to the hot water tap of the boiler assembly 210 as well) at a rate of between 1 oz/s and 5 oz/s (e.g., between 1 oz/s and 3 oz/s, between 2 oz/s and 4 oz/s, between 3 oz/s and 5 oz/s, 1 oz/s, 1.5 oz/s, 2 oz/s, 2.5 oz/s, 3 oz/s, 3.5 oz/s, 4 oz/s, 4.5 oz/s, 5 oz/s, at least 2 oz/s). In some implementations, all fluid outlets out of the boiler assembly manifold have the same flow rate. In some implementations, the flow rates may differ, as desired and/or required. The boiler assembly 210 may optionally include a system of restrictor valves to facilitate control of different flow rates to different brew tower modules 202. The pressure and/or flow rate to the brew tower modules 202 may be different or adjusted based on the type of beverage to be prepared or based on how the beverage contents (e.g., coffee or tea) are delivered to the brew tower modules 202. For example, if the beverage is to be prepared using grounds or granules, then the pressure and/or flow rate may be higher than if the beverage is to be prepared from packaged filter bags. Beverages prepared using filter bags may be prepared using lower pressure and/or flow rates so as to prevent rupturing of the filter bags. If the beverage to be prepared is pre-processed, then the pressure and/or flow rate may be even lower than the pressure and/or flow rate applied for beverages prepared using filter bags.

The boiler and power management module 203 may be used in conjunction with a reverse French press system; however, any cooking or beverage preparation system that requires hot water could be attached to the boiler and power management module 203 (e.g., espresso, tea brewing, soup, etc.). For example, the boiler and power management module 203 may be used for extracting flavor from fresh solid ingredients (such as lemon, mint, lemon grass, cucumber, etc.) into a liquid-based beverage or broth. Hot water from the boiler and power management module 203 may also be used for reconstituting soluble ingredients from powder to liquid form. The boiler and power management module 203 is configured to allow a brew tower module to be attached on either side of the boiler and power management module housing (e.g., left or right in a vertical configuration) or one brew tower module on each side. More than two (e.g., three or four) brew tower modules may be configured to be connected in some implementations. Other liquid-based preparation modules (e.g., espresso, tea brewing, soup, etc.) different than the brew tower modules described and illustrated in FIGS. 1, 2A and 2B may be compatible for attachment and operation with the boiler and power management module for store flexibility.

Figure 3:
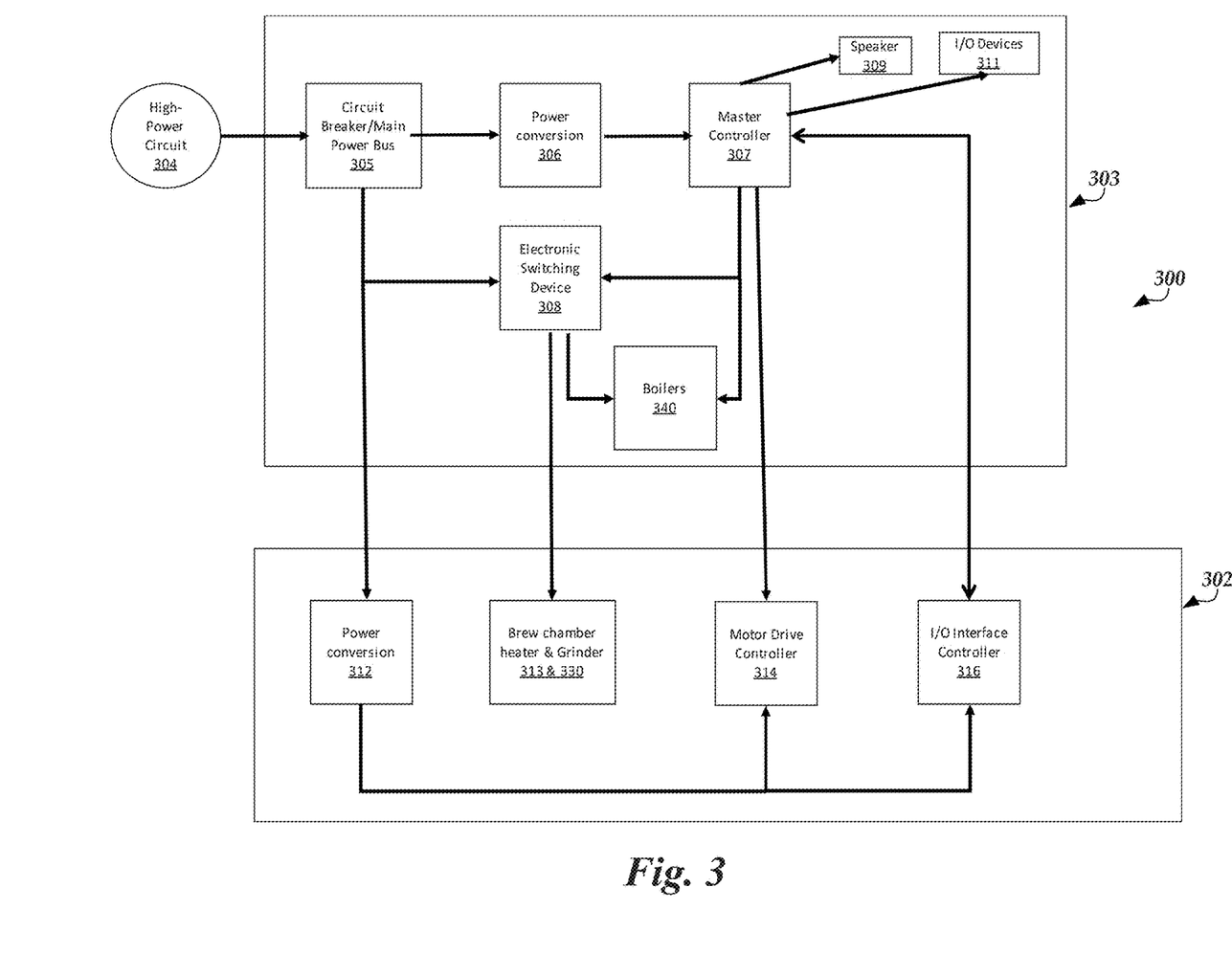
FIG. 3 is a schematic block diagram illustrative of an example electronic control implementation of a modular brew system.

FIG. 3 is a schematic block diagram illustrating an example implementation of electronic control and power management of a modular brew system 300 (e.g., the modular brew systems described herein). Only a single brew tower module 302 is illustrated for simplicity; however, two or more brew tower modules may be controlled by the boiler and power management module 303. The modular brew system 300 and its component modules 302,303 may include the structural and functional features described above in connection with the systems 100,200 and modules 102,103,202,203 of FIGS. 1, 2A and 2B; and vice-versa. As shown, the boiler and power management module 303 is the only module or component of the modular brew system 300 connected to a high-power electrical circuit/outlet 304 (e.g., via a power connection such as an electrical plug and electrical cable with appropriate wiring). In accordance with several implementations, the brew tower modules are not powered by a separate electrical circuit/outlet (e.g., high-power or low-power circuit/outlet).

In some configurations, the boiler and power management module 303 is configured to be powered by a high power circuit 304 having a voltage level of at least 200 V (e.g., 208 V, 220 V, 230 V, 240 V or more) and a current level of at least 50 A (e.g., 50 A, 100 A, 150 A or more). In some implementations, the voltage level may range from 100 V to 208 V or from 110 V to 220 V and the current level may range from 10 A to 50 A. In one implementation, the electrical circuit/outlet 304 is configured to provide power of 220 V and 50 A.

The illustrated embodiment of the boiler and power management module 303 includes a circuit breaker/main power bus 305, a power conversion/power supply module 306, a master controller 307, an electronic switching device 308, one or more boilers 310, a speaker 309, and one or more input/output devices 311 (e.g., touch screen user interface, lights and/or valves) The illustrated embodiment of the brew tower module 302 includes a power conversion/power supply module 312, a brew chamber heater 313, a grinder 320, a motor drive controller 314, and an input/output interface controller 316.

The power conversion/power supply modules 306, 312 of the boiler and power management module 303 and the brew tower module 302 are each electrically coupled to the circuit breaker/main power bus 305. The circuit breaker/main power bus 305 may be coupled to the power connector (e.g., electrical outlet plug and electrical cable) coupled to the high power circuit 304. The circuit breaker and main power bus 305 may include separate modules/circuitry for the circuit breaker and bus functions or may be integrated into a single module. The power conversion modules 306, 312 may comprise DC power supplies and/or other electrical circuitry adapted to convert AC power to DC power (e.g., transformer-based linear converter or switch mode power supply). The DC power supply 306 of the boiler and power management module 303 provides power to the master controller 307 and the DC power supply 312 of the brew tower module 302 provides power to the controllers 314, 316 of the brew tower module 302.

The master controller 307 is communicatively coupled, and sends control signals, to the boilers 310, the electronic switching device 308, the speaker 309, and the input/output devices 311 of the boiler and power management module 303, and to the motor drive controller 314 of the brew tower module 302. The master controller 307 is also communicatively coupled to the input/output interface controller 316 of the brew tower module 302 that controls input and output devices (such as a touch screen user interface and display, sensors and lights) via a data cable to facilitate input/output communication and control. The input device may include a touch screen user interface/display adapted to receive user inputs and to display textual and/or graphical options for the user to select from and/or textual/graphical output for the user to read and/or see (e.g., status information, alerts, etc.).

The motor drive controller 314 may control drivers of stepper motors or other motors or powered mechanical components operating within the brew tower module 302. The master controller 307 can be used for high-level functionality, such as, but not limited to, detecting the number of brew tower modules connected to the boiler and power management module 303, allocating power amongst the modules 302, 303 of the system 300, activating/de-activating the heating elements of the boiler assembly 310 and the brew chamber heater 313, inter-system communication, safety protocols, etc. For example, because the boiler assembly 310 may have multiple heaters, the master controller 307 may shut off one or more of the heaters as needed to increase (e.g., maximize) power provided to connected brew tower modules 302 while they need more power for operation, thereby increasing (e.g., maximizing) the amount of coffee beverages that are produced during peak demand times. The master controller 307 may control the water temperature. When water is not to ideal brewing temperature, the master controller 307 may not allow the brew tower modules 302 to prepare beverages or hot water to be dispensed by the boiler assembly 310.

The master controller 307 can determine the presence of brew tower modules 302 in a variety of ways. For example, the master controller 302 can query a resistor value in the brew tower modules 302 or can sense an amount of current that is being drawn by brew tower modules 302. The master controller 307 can also detect the presence of the brew tower modules 302 by querying the communication link between the brew tower module(s) 302 and the master controller 307 for a response. In addition, the master controller 302 can sense the water pressure or flow rate in the fluid conduits or water connection hoses and may make a determination of the presence of a brew tower module 302 based on the sensed water pressure or flow rate.

In some embodiments, each brew tower module 302 can include a resistor that can be checked, even when the brew tower module is deactivated. Accordingly, using an ohmmeter, the master controller 302 can query the resistor value of the brew tower modules 302. If the sensed resistor value satisfies an activated system resistor threshold, the master controller 307 can determine that a brew tower module 302 is operatively connected. The process can be repeated until the master controller 302 determines the number of brew tower modules 302 operatively connected. The activated system resistor threshold can be determined based on a resistor installed on each brew tower module 302.

In certain embodiments, the boiler and power management module 303 can include an ammeter that can be used to detect the amount of current being drawn from brew tower modules 302. Using the ammeter, if the master controller 307 determines that an activated system current threshold is satisfied, the master controller 307 can determine that a brew tower module is operatively connected. If the sensed current does not satisfy the activated system current threshold, the master controller 307 can determine that there is not a brew tower module connected. The activated system current threshold can be determined based on an amount of current that is drawn by brew tower modules 302 when deactivated. The amount of current drawn by a brew tower module when deactivated can be set during manufacturing or installation. For example, the brew tower modules 302 can be designed to draw a very small current to power some features of the brew tower module 302, even when the brew tower module 302 is deactivated.

It will be understood that additional methods can be used to detect the presence of brew tower modules 302. For example, in some implementations, the master controller 302 simply receives control signals from the brew tower modules 302 indicating connectivity.

In some implementations, if the master controller 307 determines that a brew tower module 302 is operatively connected or disconnected, it can alert a user. The master controller 307 can alert the user via a visual and/or audible alert (e.g., light and/or sound) or an electronic communication (e.g., via a touch screen user interface of the boiler and power management module 303).

The master controller 307 may have stored in memory power management algorithms containing instructions that, when executed, effectively manage power received from the high power circuit 304 (e.g., via a power connector/power connection, such as a plug adapted to be inserted into an electrical outlet and an electrical cable) so as to facilitate simultaneous operation of multiple brew tower modules. The master controller 307 manages power usage by the heating elements of the centralized boiler assembly 210 and power usage by the heating elements of the brew chambers and motors of the grinding assembly (e.g., grinders) in the brew tower modules. The centralized power management and modular configuration facilitates running the modular brew system 300 with one high-power (e.g., 50 A, 220 V) circuit. Because the master controller 307 of the centralized boiler and power management module 303 controls the power, it simplifies the safety circuit for the combined electrical system including the brew tower modules 302. In accordance with several embodiments, the centralized power management allows for maximization of the power coming out of the electrical outlet (e.g., 220V, 50 A high-power circuit 304) by diverting power from one or more of the multiple heating elements of the boiler assembly 210 to the power demands of the connected brew tower modules (e.g., brew chamber heaters or grinder motors).

The electronic switching device 308 may include any number of switching devices (e.g., solid-state relay bank transistor, field-effect transistors (FETs), bi-polar junction transistors (BJTs), mechanical relays, triodes for alternating current (TRIACs), etc. that toggles on and off various components (e.g., heating elements, mechanical elements) of the boilers 310, the brew chamber heater 313, or grinder 320 based on control signals received from the master controller 307. The master controller 307 is configured to receive inputs from the brew tower module 302 to facilitate controlled power management of the overall modular system 300, including providing controlled power signals to the brew tower module(s) 302. The hoppers 315, grinders 320, boilers 310, and brew assemblies 325 may incorporate the functional and/or structural features of the corresponding hoppers, grinders, boilers, brew assemblies described herein or in U.S. Pat. No. 9,930,987.

It will be understood that each boiler and power management system 303 and each brew tower module 302 can include fewer or more components as desired. In various embodiments, the controllers 314, 316 can be implemented as a single controller or as separate controllers. The respective controllers 307, 314, 316 can be implemented using one or more printed circuit board assemblies, microcontrollers, microprocessors, field programmable gate arrays (FPGAs), application-specific integrated circuits (ASICs), programmable logic device (PLDs), and/or the like.

Figure 4:
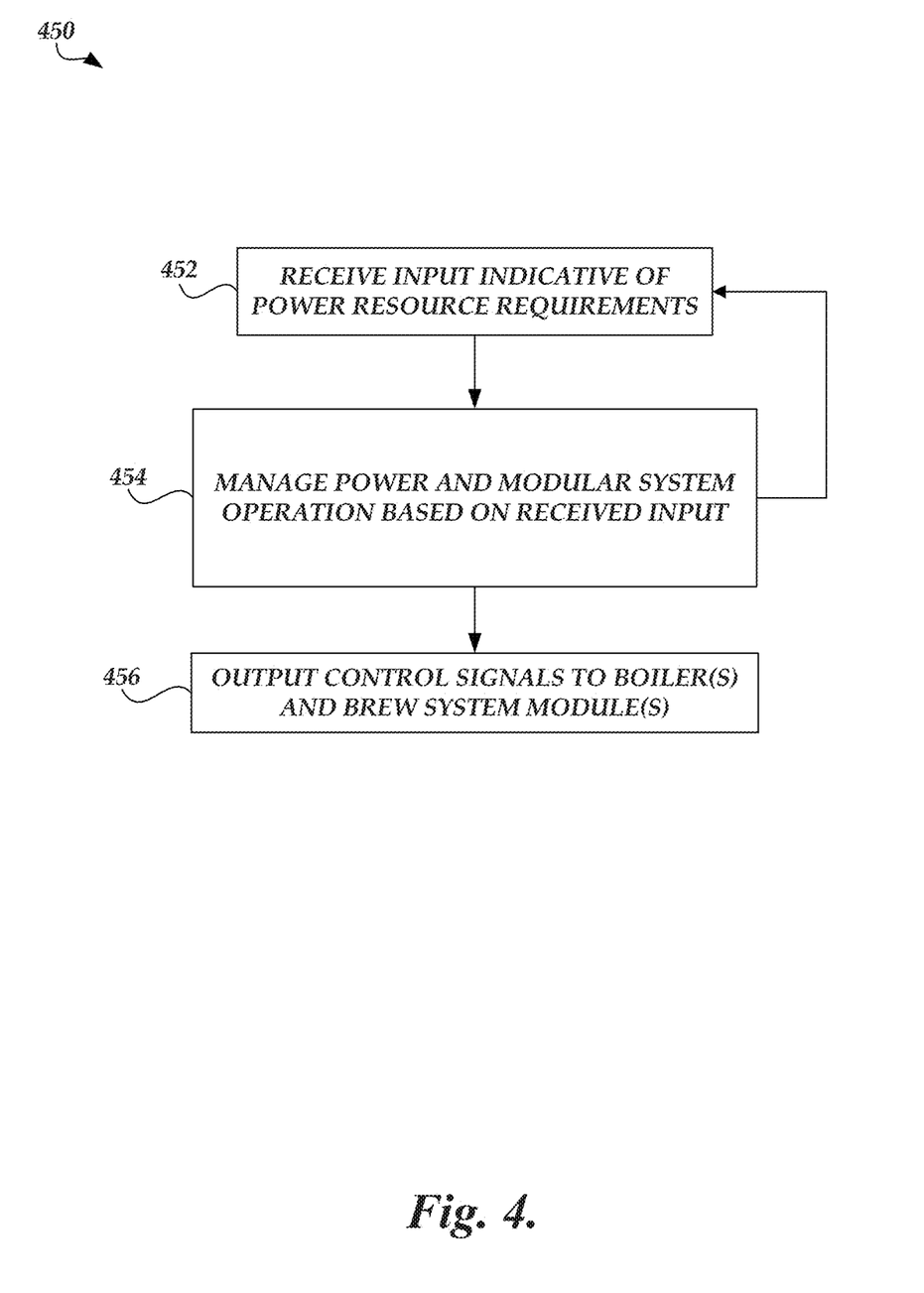
FIG. 4 is a flow diagram illustrative of an embodiment of a routine implemented by a controller of the boiler and power management module for managing power and operation of a modular brew system.

Turning to FIG. 4, a flow diagram illustrative of an embodiment of a routine 450 implemented by the master controller 307 of the boiler and power management module 303 is provided for managing power and operation of the brew tower(s) operatively coupled to the boiler and power management module. At Block 452, the master controller 307 receives input indicative of power resource requirements or consumption from the I/O interface controller 316 of each of the brew tower modules 302 operatively connected to the boiler and power management module 303. At Block 454, the master controller 307 executes power management algorithms to efficiently manage power and operation of the overall modular system 300 based on the received input. At Block 456, the master controller 307 generates control signals to the boilers 310, the electronic switching device 308, and the motor drive controller 314 to control operation of the heating elements of the boilers 310, the heating elements of the crew chamber heater 313, mechanical components of the grinder 320, and/or other power consuming components. Power to the various components may be continuously adjusted (e.g., increased, decreased, or shut off) to allocate power resources most efficiently.

Figure 5:
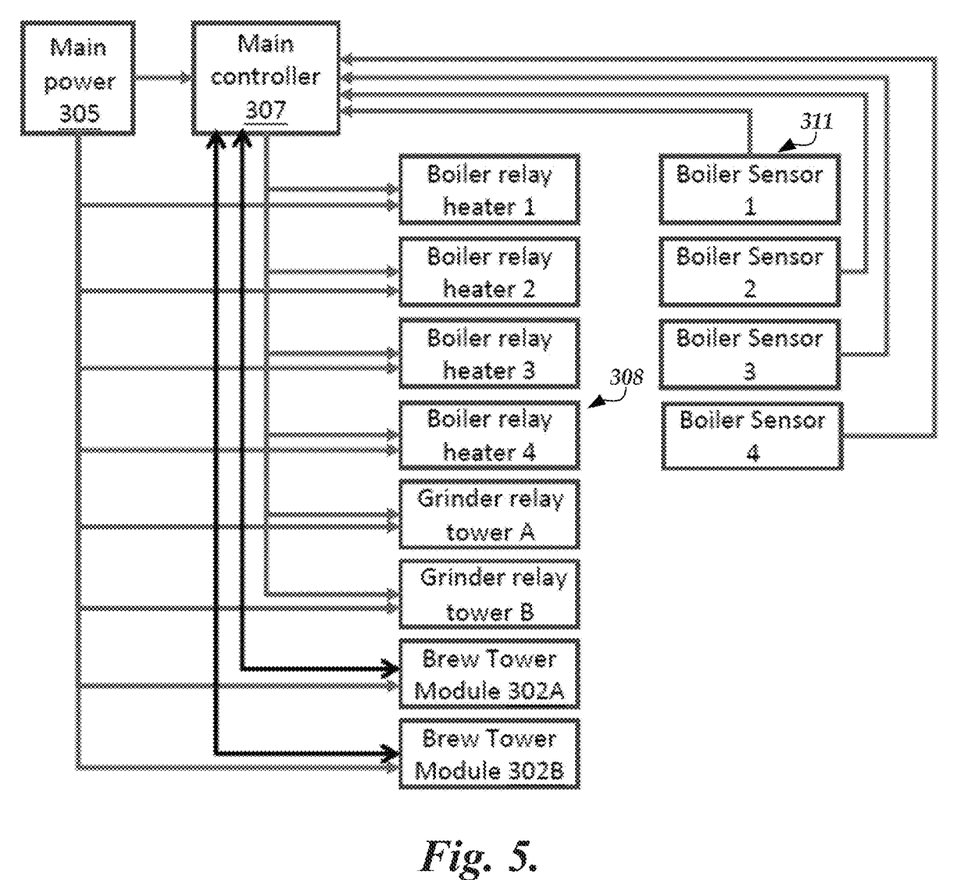
FIG. 5 is a schematic block diagram illustrative of an example power management implementation of a modular brew system.

FIG. 5 is a schematic block diagram illustrating an example schematic implementation 500 of input and output signals between various components of the modular brew system to facilitate control and power management of the modular brew system (e.g., systems 100, 200, 300) described herein. The power management scheme is adapted to facilitate efficient management of power between the power-consuming components of the brew tower modules and the centralized boiler module. The schematic block diagram of FIG. 5 includes the main power unit 305 (e.g., circuit breaker/main power bus) and the main controller 307 (as first shown in FIG. 3). The schematic block diagram of FIG. 5 further includes four boiler relays corresponding to four water heaters and two grinder relays. The relays may be components of the electronic switching device 308 shown in and described in connection with FIG. 3 (e.g., solid state relay bank). The main controller 307 is configured to generate control signals to the relays to control operation and power to (e.g., start, stop, adjust operational parameters of) the water heaters in the boiler and power management module 203, 303 and the grinder motors in the brew tower modules 202, 302. The main controller 307 is configured to receive input signals from boiler sensors indicative of operation and/or parameters associated with the boilers 310 (e.g., water temperature, power requirements). The boiler sensors may be examples of the I/O devices 311 schematically illustrated in FIG. 3. The main power unit 305 is configured to provide power to the relays and to various components of the brew tower modules 202, 302 as illustrated in FIG. 3 (e.g., motor drive controller 314 and I/O interface controller 316). As shown in FIG. 5, the main controller 307 is also configured to send and receive signals from the brew tower modules 202, 302 to facilitate power management.

In accordance with several implementations, upon startup of the boiler and power management module 203, 303, power is allocated to the water heaters of the boiler assembly 110, 210, 310 until the water reaches a desired temperature (e.g., as determined by the boiler sensors shown in FIG. 5). After the water heaters reach the desired temperature, power may be diverted to brew chamber heaters in any brew tower modules connected to the boiler and power management module. In a steady state, power may be applied to one or more of the water heaters in the boiler assembly of the boiler and power management module as needed to keep water temperature at the desired temperature. Power may also be applied to the brew chamber heaters as needed in any connected brew tower modules.

During brewing operation, power may be diverted to the grinder assembly of any connected brew tower modules that have been activated to brew a beverage (e.g., coffee). Power may be terminated to the brew chamber heaters and water heaters in the boiler assembly while any grinding assemblies are active to conserve power. The master controller 307 may be configured to delay brewing if the water and brew chambers are not at a desired brewing temperature. The master controller 307 may deactivate or disable a dispensing assembly or a hot water tap of the boiler and power management module until all the boilers of the boiler assembly have reached a desired temperature. The prepared beverage (e.g., coffee) may be dispensed by the one or more brew tower modules once hot water is available. Brewing operations may have priority over dispensing of hot water through the hot water tap such that hot water may not be dispensed through the hot water tap during brewing operations.

CONCLUDING LANGUAGE

Although mainly described with respect to a coffee brewing system and a coffeehouse or store environment, it will be understood that the embodiments described herein can have wide applicability in modular cooking/beverage preparations systems that manage power and provide certain centralized structure and functionality requiring significant power. As used herein, the term "beverage," in addition to having its ordinary meaning, can include, among other things, any liquid or substantially liquid substance or product having a flowing quality such as juices, coffee beverages, teas, frozen yogurt, beer, wine, cocktails, liqueurs, spirits, cider, soft drinks, flavored water, energy drinks, soups, broths, combinations of the same, or the like.

The use of the term "module" herein should not be interpreted as requiring implementation as a purely software-based code module but, as illustrated and described herein, can represent a physical unit or structural modular component capable of modular assembly (e.g., physical, electrical, and/or communicative coupling) to another structural base component.

All of the processes described herein may be embodied in, and fully automated via, software code modules executed by one or more specialized computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof. A software module can reside in RAM memory, flash memory, ROM memory, EPROM memory, EEPROM memory, registers, hard disk, a removable disk, a CD-ROM, or any other form of non-transitory computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Some embodiments have been described in connection with the accompanying drawings. However, the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art. Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together. Execution in a cloud computing environment in some embodiments supports a multiplicity of conditions to be computed contemporaneously.

The various illustrative logical and schematic blocks and algorithms described in connection with the embodiments disclosed herein can be implemented or performed by a machine, such as a processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

In some embodiments, the modular brew system comprises one or more of the following: means for heating water (e.g., a boiler assembly), means for grinding coffee beans (e.g., a grinder assembly), means for storing coffee beans (e.g., one or more hoppers), means for brewing a coffee beverage using the grounds and heated water (e.g., a brew assembly including a brew chamber), means for dispensing a prepared coffee beverage (e.g., tap or spout), means for managing power of the modular brew system (e.g., controller or processor), etc.

In some embodiments, the modular brew system comprises various features that are present as single features (as opposed to multiple features). For example, in one embodiment, the system includes a single brew tower module, a single hopper, a single boiler, etc. Multiple features or components are provided in alternate embodiments.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A method of facilitating brewing of coffee using a modular brew system, the method comprising:
heating water in a boiler assembly of a base module of the modular brew system;
supplying a first portion of the heated water to a first brew chamber of a first brew tower module of the modular brew system to facilitate preparation of a first coffee beverage within the first brew chamber of the first brew tower module,
supplying a second portion of the heated water to a second brew chamber of a second brew tower module of the modular brew system to facilitate preparation of a second coffee beverage within the second brew chamber of the second brew tower module,
wherein the first brew tower module, the second brew tower module, and the base module comprise separate structural units; and
providing power allocation supplied by a single high power circuit to the base module and the first brew tower module, and simultaneously providing power to the base module and the second brew tower module, wherein providing the power allocation is performed by a common master controller of the base module.

2. The method of claim 1, wherein the first brew tower module and the second brew tower module each comprise a grinder assembly configured to grind coffee beans into grounds of a particular size.

3. The method of claim 1, wherein supplying the first portion of the heated water to the first brew chamber comprises delivering at least 2 ounces of heated water per second to the first brew chamber and wherein supplying the second portion of the heated water to the second brew chamber comprises delivering at least 2 ounces of heated water per second to the second brew chamber.

4. The method of claim 1, wherein providing the power allocation comprises diverting power from one or more heating elements of the boiler assembly of the base module to one or more components of at least one of the first brew tower module and the second brew tower module.

5. The method of claim 1, wherein the first brew tower module and the second brew tower module are not powered separately by an electrical outlet.

6. The method of claim 1, wherein providing the power allocation comprises operating the first brew tower module and the second brew tower module simultaneously.

* * * * *